Patented Mar. 18, 1947

2,417,468

UNITED STATES PATENT OFFICE 2,417,468

METHOD OF REMOVING PLASTIC COATING FROM A METAL ARTICLE

Victor J. Canziani, Brooklyn, and Frank W. Stellwagen, Richmond Hill, N. Y., assignors to Fairchild Camera and Instrument Corporation, Jamaica, N. Y., a corporation of Delaware No Drawing. Application April 20, 1944, Serial No. 532,002

8 Claims. (Cl. 134—28)

This invention relates to a process of removing a plastic coating from a metal article, more particularly to a process for stripping insulation coatings from insulated wire; and especially for stripping insulation of the flexible synthetic polymer type from a copper wire.

Small size electric wires of the order of .0038 inch diameter and smaller are advantageously and conveniently insulated with organic polymers (herein referred to broadly as "plastics" without regard to their plasticity in the finished condition) such as, for example, poly-vinyl acetal, which is commercially distributed as "Formex" or "Formvar." This material, while having excellent dielectric properties and high resistance to rupture upon flexing, is difficult to remove from the wire by mechanical or chemical processes without damaging the wire or subjecting the operator to dangerous working conditions. When this plastic insulation is mechanically stripped as by scraping, the removal of the material is usually accompanied by some physical damage to the wire. For example, the wire may be creased or gouged to such an extent that it subsequently breaks during connection or while in use.

It has been proposed to dip the coated wire in solder and various chemicals heated to above 1000° F. and thereby remove the plastic coating by thermal decomposition. Aside from the dangers attendant to the high temperature, we have found that the smaller size wires tend to become brittle in the region adjacent the treated portion.

Furthermore, in the solder method, it has been found necessary to wipe off the stripped wire with a cloth to remove charred material or solder dross, and where hot chemicals are used, to dip the stripped wire in water and thereafter wipe it dry in order to assure an electrically clean and conductive surface.

It is accordingly among the objects of our invention to provide a method of removing plastic coating from a metal article which is simple, inexpensive and harmless in practice, and which does not need trained personnel for efficient use. Another object is to provide a method of stripping a plastic coated wire rapidly and cleanly without damaging the wire in any way. Other objects will be in part apparent and in part pointed out hereinafter.

We have found that by immersing the plastic coating on the metal, for example, the "Formex" on fine copper wire, in a substance that swells the plastic without burning it and without dissolving, the bond is broken between the plastic and the wire, and clean stripping of the insulation is thus facilitated. Ordinarily it is desirable to further weaken the insulation for which purpose the plastic may then be further treated with a suitable solvent for the swelling agent so as to render mechanical removal of the plastic easy and harmless to the fine wire, or the treated material may be chilled below the temperature at which the swollen material becomes more brittle.

According to my invention, we first dip the coated wire for a short period of time in a hot bath including a substance which is at least partially miscible with the plasticizer or the polymer on the wire, or both, and which thus diffuses into and swells the material so as to break its bond with the wire. This first treatment also may materially lessen the tensile strength of the coating, thus rendering it more amenable to subsequent physical removal. In any event, it appears that immersion in this first bath softens the coating. Advantageously, this first bath comprises or includes a higher saturated fatty acid, which, while not necessarily neutral to the copper wire, is quite mild so as to preclude any substantial corrosion. Also, the temperature to which the first bath is heated is insufficient to cause carbonization of the coating.

After an immersion of short duration in the first bath, advantageously the wire is dipped into a second bath by which the swelled coating is weakened and made more frangible for easy removal. The second bath also may be heated and comprises a material having the property of at least partially removing by solution the swelling agent and/or plasticizer used in the coating. This bath should not dissolve the plastic of the wire coating, i. e., the vinyl or other polymer. This second treatment results in a reduction of tensile strength without, however, corroding the wire or otherwise harming it, as the material of the second bath is neutral to the wire. Here also the operating temperature is insufficient to cause carbonization, it being well below the boiling point of the substance.

Instead of such solvent dip, the second treatment may be a chilling by air blast or dip into a chilled non-solvent liquid, or otherwise to chill the coating to a temperature at which it is readily broken away. Thus it will be noted that in one case the swelling agent is at least partially removed by the immersion in the second bath, while in the other case it is crystallized by chilling; in either event the tensile strength of the plastic coating is so weakened that it may readily be stripped from the wire in a manner to be described.

The period of immersion in the second bath may approximate that in the first bath, the two dips accordingly taking but a small amount of time. After the second immersion, the coating may readily be removed by any suitable mechanical process that is not harmful to the wire. Thus the wire may be held in one hand between the thumb and forefinger while the treated portion is stroked by the fingers of the other hand. By lightly pressing the edge of the thumb nail of the stroking hand into the treated coating, the coating can be broken to start the stripping action. The pressure used, however, should be light and cautiously exerted to preclude the formation of a potentially harmful bend in the fine copper wire. With the coating thus broken, it may easily be stripped from the wire, leaving the wire surface electrically clean. As the tensile strength of the coating has been materially reduced by the two immersions, only very light pressure or tension is required to stroke the coating from the wire.

As to the character of the first bath, we have found that the common fatty acids of at least 16 carbon atoms are most advantageous as the swelling agent for the plastic. Stearic acid and to a lesser extent palmitic acid have been found best. While the temperature of the first bath may under certain circumstances be varied somewhat according to thickness of the plastic coating which is being removed, satisfactory results are obtainable at a range of 400°–500° F. The article being treated, e. g., the insulated wire, should be immersed in this bath until the plastic coating swells and its bond with the wire is broken. While the period of the immersion is to a certain extent a function of the thickness of the plastic, we have obtained good results from a 5–10 second immersion for the finer size wires.

After such immersion, it may be observed that the plastic coating has swelled substantially relative to its initial size and, we believe, that in the process of doing so, the bond between the coating and the metal is broken. The wire is then immediately dipped into the second bath, the principal property of which is that it is a solvent for the swelling agent included in or comprising the first bath. This solvent may be selected as desirable from among the alcohols, ketones, esters, chlorinated solvents and ethers, good results having been obtained with the use of isopropyl alcohol, denatured alcohol, methyl ethyl ketone, methyl isobutyl ketone, dioxane, ethyl butyrate, oil of cloves, "glyptal thinner," methyl acetate and chloroform.

The temperature of the second bath should be maintained at from 120° to 140° F. depending to a certain extent on the solvent chosen, except in the case of chloroform which should be used cold. In any event, the temperature of the second bath should be less than the boiling point of the solvent selected. The wire is immersed in the second bath 5 to 10 seconds, during which time the softening agent is dissolved, thus leaving the plastic coating in a condition to be readily stripped from the wire. The coating is stripped as noted above, by gently stroking the treated coating which comes off the wire in the form of a tube.

When the plastic is thus stripped from the wire, particularly where the material of the second bath comprises a solvent for the swelling agent, it strips off cleanly and in one piece. Thus it follows that if a substantial length of capillary tubing is desired, an equal length of coated wire may be treated in the manner hereinbefore described, and the coating stripped therefrom.

We claim:

1. In the art of stripping a flexible polymer insulation from a wire, the steps of, immersing the wire in a bath including a fatty acid of sixteen or more carbon atoms, thereafter immersing the wire in a second bath including a substance capable of dissolving the acid, and thereafter stripping the plastic from the wire.

2. In the art of stripping a flexible polymer insulation from a wire, the steps of, immersing the wire in hot stearic acid, thereafter immersing the wire in a solvent of the stearic acid, and thereafter stripping the plastic from the wire.

3. In the art of stripping insulation comprising a flexible synthetic polymer from a wire, the steps of, immersing the wire in a bath including a fatty acid of at least 16 carbon atoms to swell the polymer and break its bond with the wire, and thereafter mechanically stripping the polymer from the wire.

4. In the art of stripping insulation comprising a flexible synthetic polymer from a wire, the steps of, immersing the wire in a bath including a fatty acid of at least 16 carbon atoms to swell the polymer and break its bond with the wire, then immersing the wire in a second bath including a substance capable of dissolving the fatty acid, and thereafter stripping the polymer from the wire.

5. In the art of stripping insulation comprising a flexible synthetic polymer from a wire, the steps of, immersing the wire in stearic acid heated to a temperature of from 400° to 500° F., then immersing the wire in a solvent of the stearic acid heated to a temperature of from 120° to 140° F., and thereafter stripping the polymer from the wire.

6. In the art of stripping insulation comprising a flexible synthetic polymer from a wire, the steps of, immersing the wire in hot stearic acid for five to seven seconds, thereafter immersing the wire in a second heated bath including a substance capable of dissolving the stearic acid for a period of five to ten seconds, and thereafter stripping the polymer from the wire.

7. In the art of stripping insulation comprising a flexible polymer from a wire, the steps of immersing for a small fraction of a minute the wire in stearic acid heated to a temperature of from 400 to 500° F., then immersing for a small fraction of a minute the wire in a solvent of the stearic acid but not of the polymer heated to a temperature of from 120 to 140° F., and thereafter mechanically removing the polymer from the wire.

8. In the art of stripping insulation comprising a flexible polymer from a wire, the steps of immersing the wire in a bath including hot stearic acid, then immersing the wire in a bath including a substance selected from the class consisting of the alcohols, ketones, esters, chlorinated solvents and ethers, and thereafter stripping the polymer from the wire.

VICTOR J. CANZIANI.
FRANK W. STELLWAGEN.

REFERENCES CITED

The following references are of record in the file of this patent:

UNITED STATES PATENTS

| Number | Name | Date |
| --- | --- | --- |
| 1,875,552 | Bateman | Sept. 6, 1932 |